V. DE MARAIS.
CLUTCH DEVICE.
APPLICATION FILED JULY 17, 1914.
1,155,220.
Patented Sept. 28, 1915.
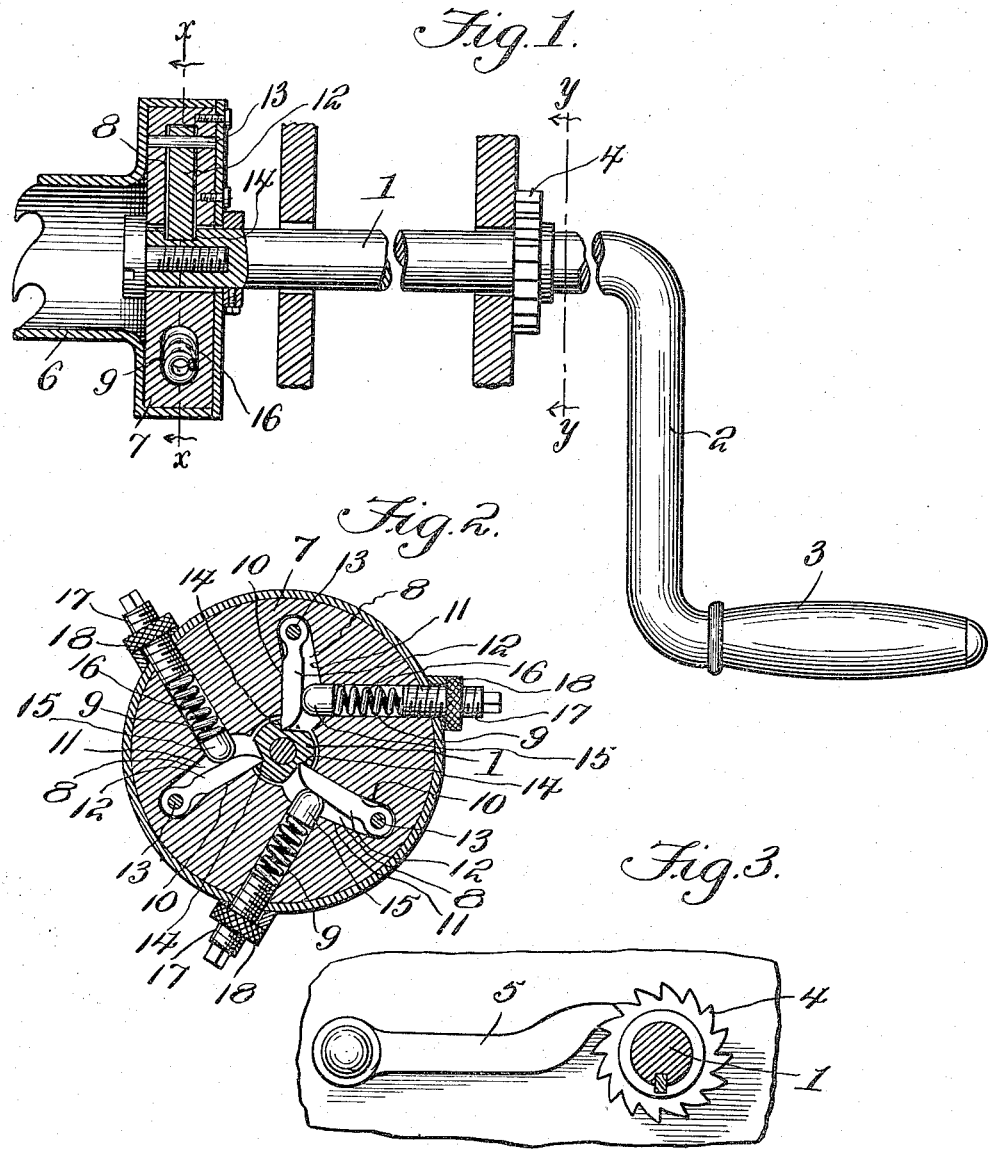
Witnesses
J. T. L. Wright
V. B. Hillyard
Inventor
Victor DeMarais
By Victor J. Evans
Attorney

UNITED STATES PATENT OFFICE.

VICTOR DE MARAIS, OF CHICO, CALIFORNIA.

CLUTCH DEVICE.

1,155,220.     Specification of Letters Patent.     Patented Sept. 28, 1915.

Application filed July 17, 1914. Serial No. 851,542.

*To all whom it may concern:*

Be it known that I, VICTOR DE MARAIS, a citizen of the United States, residing at Chico, in the county of Butte, and State of California, have invented new and useful Improvements in Clutch Devices, of which the following is a specification.

Engines of the internal combustion variety by reason of their peculiar mode of operation require the expenditure of energy to start them. This is usually effected by hand, through the instrumentality of a crank and such operation is hazardous because of the liability of such engines to start prematurely and cause the crank to rotate backward.

The present invention provides a clutch device which avoids injury to the operator in the event of the engine back-firing or turning backward from any cause when throwing the same over in the act of starting.

The invention consists of the novel features, details of construction and combination of parts, which hereinafter will be more particularly set forth, illustrated and claimed.

In the drawings hereto attached:—Figure 1 is a side view of a starting crank provided with safety means embodying the invention. Fig. 2 is a sectional view on the line $x$—$x$ of Fig. 1. Fig. 3 is a sectional view on the line $y$—$y$ of Fig. 1 showing more clearly the ratchet mechanism for holding the crank against backward rotation.

Corresponding and like parts are referred to in the following description, and indicated in all the views of the drawings, by the same reference characters.

The clutch device embodies a shaft member 1, arm 2 and handle 3. A ratchet wheel 4 is secured to the shaft 1 and a dog 5 mounted upon the frame of the machine or other suitable support is adapted to coöperate with the teeth of the ratchet wheel 4 to prevent backward rotation of the crank while at the same time admitting of such crank being turned freely in a forward direction to start the engine.

A half clutch or starting jaw 6 is secured to a rotary member 7 which is loosely mounted upon the shaft 1, such member being in the form of a disk or drum and formed with a plurality of recesses 8 and openings 9. The recesses 8 are closed at their outer ends and open at their inner ends into the eye which receives the shaft 1. The rear wall 10 of each of the recesses 8 is straight, whereas the front wall 11 is curved. The recesses 8 have an approximate radial arrangement. Dogs 12 are located in the recesses 8 and are pivoted at their outer ends upon pins 13. The inner ends of the dogs 12 are beveled upon their forward corners so as to ride upon the inclined faces of notches 14 formed in the sides of the shaft 1. The rear faces of the notches 14 are straight and are adapted to engage the rear straight faces of the dogs 12. When cranking the engine the dogs 12 lie against the straight walls 10 of the recesses 8 and the straight faces of the notches 14, the dogs being held in such position by yielding means fitted in the openings 9.

The openings 9 have an approximate tangential arrangement and receive plungers 15, expansible helical springs 16 and adjusting screws 17, the latter being retained in the adjusted position by means of lock nuts 18. The plungers 15 bear against the forward sides of the dogs 12 and normally hold such dogs against the straight sides 10 of the recesses. The tension of the springs 16 may be regulated by means of the adjusting screws 17. When cranking the engine the shaft 1 is rotated in a clockwise direction, the dogs 12 being held in normal position by the action of the springs 16. Should the engine back-fire or tend to rotate backward from any cause the member 7 being clutched to the shaft of the engine turns in an anticlockwise direction and the inner ends of the dogs 12 move forward and clear the notches 14 and ride upon the shaft 1, such action being provided for by the yielding of the springs 16, the shaft 1 being held from turning backward by means of the ratchet wheel 4 and dog 5.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

In combination with a starting crank having an annular arrangement of teeth adjacent one end, a rotary member having radially disposed recesses and openings intersecting with the recesses about at a right angle, dogs pivotally mounted in the recesses and adapted to engage the teeth of the starting crank, each of said dogs normally lying substantially in a line with the axis of its pivot and the axis of the toothed portion of the crank, each tooth formed in the crank having one wall arranged parallel to one face of the dog and the remaining wall extending at right angles thereto, plungers mounted in the openings, expansible helical springs arranged in said openings and pressing the plungers forwardly, and adjusting screws threaded into the openings for adjusting the tension of said spring.

In testimony whereof I affix my signature in presence of two witnesses.

VICTOR DE MARAIS.

Witnesses:
LON BOND,
S. D. SILLERS.

Copies of this patent may be obtained for five cents each, by addressing the "Commissioner of Patents, Washington, D. C."